(12) United States Patent
Yamada

(10) Patent No.: US 8,013,585 B2
(45) Date of Patent: Sep. 6, 2011

(54) DC-DC CONVERTER AND DC-DC POWER CONVERSION METHOD EMPLOYING OVERCURRENT PROTECTION

(75) Inventor: Kouhei Yamada, Matsumoto (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 825 days.

(21) Appl. No.: 12/051,556

(22) Filed: Mar. 19, 2008

(65) Prior Publication Data

US 2008/0231244 A1  Sep. 25, 2008

(30) Foreign Application Priority Data

Mar. 19, 2007  (JP) ................ 2007-070530

(51) Int. Cl.
*G05F 1/573*  (2006.01)
(52) U.S. Cl. ............... 323/285; 363/56.03; 323/223
(58) Field of Classification Search .............. 323/223, 323/282–288; 363/50, 56.03
See application file for complete search history.

(56) References Cited

U.S. PATENT DOCUMENTS

| 6,577,110 | B2 * | 6/2003 | Van Auken | 323/282 |
| 7,045,993 | B1 * | 5/2006 | Tomiyoshi | 323/224 |
| 7,109,692 | B1 * | 9/2006 | Wu et al. | 323/282 |
| 2004/0263139 | A1 | 12/2004 | Goto et al. | |
| 2005/0231177 | A1 * | 10/2005 | Tateno et al. | 323/225 |

FOREIGN PATENT DOCUMENTS

| JP | 2004-364488 | 12/2004 |
| JP | 2005-020833 | 1/2005 |

* cited by examiner

*Primary Examiner* — Harry Behm
(74) *Attorney, Agent, or Firm* — Rabin & Berdo, P.C.

(57) ABSTRACT

An overcurrent detection circuit (50 in FIG. 1) in a DC-DC converter is connected to a switching control circuit (1), and detects an inductor current flowing through an inductor (L) during the ON control of a switching element (Mn), so as to decide whether the inductor current has decreased down to a prescribed value. The switching control circuit (1) alters the switching timing of a control signal to extend the OFF state of a switching element (Mp) until the decrease of the inductor current to a predetermined magnitude is decided by the overcurrent detection circuit (50). Even when a delay is involved in an overcurrent detection operation, the DC-DC converter is still capable of overcurrent limitation.

10 Claims, 6 Drawing Sheets

CHANGE OF INDUCTOR CURRENT VALUE (VOUT: LARGE)

CHANGE OF INDUCTOR CURRENT VALUE (VOUT: SMALL)

CHANGE OF INDUCTOR CURRENT VALUE (VOUT; SMALL)

DC-DC CONVERTER AND DC-DC POWER CONVERSION METHOD EMPLOYING OVERCURRENT PROTECTION

BACKGROUND OF THE INVENTION

1. Field of the Invention

The present invention relates to a DC-DC converter that feeds a load circuit with a DC voltage at a predetermined magnitude, and more particularly to a DC-DC converter that has an overcurrent protection function.

2. Description of the Related Art

Heretofore, in personal computers of notebook type, portable telephones or any other portable electronic equipment, battery voltage has been stepped down to a prescribed voltage by a DC-DC converter such as a step-down type switching power supply circuit, so as to feed and drive an electronic circuit with the prescribed voltage. Overcurrent protection circuits that protect switching elements from overcurrents have been used in such arrangements.

FIG. 5 is a diagram showing an example of a prior-art DC-DC converter that performs overcurrent protection by limiting the peak of an inductor current $I_L$. This type of DC-DC converter is so configured that a first switching semiconductor element (hereinbelow, termed the "switching element") Mp, which consists of a field-effect transistor (FET) of P-channel type whose source terminal is connected to an input voltage Vin from a battery, and a second switching element Mn, which consists of an FET of N-channel type whose source terminal is grounded, have their drain terminals connected to each other, and that the gate terminals of the respective switching elements Mp and Mn are fed with control signals through driver circuits 2 and 3 from a switching control circuit 1. One end of each of a charging/smoothing output capacitor Cout and a load circuit 4 is connected to the connection point between the switching elements Mp and Mn, through an inductor L, and the other ends of the output capacitor Cout and the load circuit 4 are respectively grounded.

The inductor L and the output capacitor Cout constitute a filter circuit that feeds a smoothed output voltage Vout to the load circuit 4. In order to detect the output voltage Vout to the load circuit 4, this output voltage Vout is fed to the switching control circuit 1 as a negative feedback signal. While monitoring the output voltage Vout, the switching control circuit 1 outputs control signals to the switching elements Mp and Mn through the corresponding driver circuits 2 and 3 and controls these switching elements so as to alternately turn ON/OFF, in order that the output voltage Vout may become a constant value.

An overcurrent detection circuit 5 senses an overcurrent in such a way that a current flowing through the switching element Mp, namely, the inductor current $I_L$ flowing from the switching element Mp into the inductor L is detected by, for example, a current transformer, or a sense resistance and an amplifier, and that the detected current is compared with a predetermined reference value. The DC-DC converter is so configured that, in a case where the overcurrent has been sensed by the overcurrent detection circuit 5, the switching control circuit 1 controls the switching element Mp into the OFF state thereof.

In the prior-art DC-DC converter, during the execution of an ordinary switching operation, the switching control circuit 1 changes the pulse widths of the pulse signals for controlling the switching elements Mp and Mn into the ON and OFF states thereof, in accordance with the change of the output voltage Vout, thereby to perform feedback control so that this output voltage Vout may become constant. Thus, even in a case of a heavy load in which a feed current Iout to the load circuit 4 is large, energy which has been accumulated in the inductor L in accordance with the load during the OFF state of the switching element Mp is emitted through the switching element Mn, so that efficient synchronous rectification can be performed.

When the current ($=I_L$) flowing through the switching element Mp on the side of the input voltage Vin of the DC-DC converter exceeds a prescribed value Ipmax, an overcurrent detection signal is outputted from the overcurrent detection circuit 5, and the switching element Mp is held in the OFF control state till the next switching cycle through the switching control circuit 1. In this way, the overcurrent limitation function of limiting the peak current value Ip of the inductor current $I_L$ to, at most, the prescribed value Ipmax by the overcurrent detection circuit 5 is realized.

However, a certain delay time is required for switching and turning OFF the switching element Mp after the current exceeding the prescribed value Ipmax has been actually sensed by the overcurrent detection circuit 5. Therefore, even when the overcurrent state has been sensed the moment the switching element Mp has been shifted into the ON control state by the drive signal from the switching control circuit 1, the inductor current $I_L$ continues to increase for a time period until the switching element Mp actually falls into the OFF state through the overcurrent detection circuit 5.

FIGS. 6A and 6B show how the inductor currents change in states in which the overcurrent protection function of the prior-art DC-DC converter is operating, in cases where the output voltage Vout is large and where it is small, respectively. In each of the figures, the ordinate axis represents the inductor current $I_L$, while the abscissa axis represents the time.

Here, let "Td" denote the minimum delay time which is required for bringing the switching element Mp into the OFF control state in the case where the inductor current $I_L$ has exceeded the prescribed value Ipmax. Since the decrease rate of the inductor current $I_L$ is proportional to the output voltage Vout ($dI_L/dt=Vout/L$), a longer time period is required for the decrease of the inductor current $I_L$ in the case where the output voltage Vout is low, than in the case where it is high, as shown in FIG. 6B. On the contrary, the rate of increase of the inductor current $I_L$ becomes larger as the output voltage Vout becomes lower ($dI_L/dt=(Vin-Vout)/L$). As shown in FIG. 6B, therefore, the inductor current $I_L$ continues to rise at a large gradient with the delay time Td, even after this inductor current $I_L$ has exceeded the prescribed value Ipmax. Then, within a time period for which the switching element Mp is under the OFF control, the inductor current $I_L$ begins to rise in the next switching cycle, in a state where this inductor current $I_L$ having increased till then cannot decrease sufficiently.

In this manner, with the overcurrent detection by the overcurrent detection circuit 5 in the prior art, the overcurrent limitation function for the inductor current $I_L$ might fail to effectively operate. Moreover, if the delay time Td since the detection of the overcurrent is constant, it will become more difficult for the overcurrent limitation to function normally as a switching frequency in the switching control circuit 1 continues to rise.

In such a switching power supply, accordingly, an overcurrent protection method for a switching power supply circuit has been considered in which an inductor current ($I_L$) is prevented from increasing at a minimum ON-duty time (Tmin) (refer to, for example, JP-A-2004-364488 (especially, paragraphs [0046]-[0080] and FIGS. 1, 2 and 3), which corresponds to U.S. Pat. No. 7,068,023 B2).

JP-A-2004-364488 discloses a technique including an overcurrent detection circuit (221) that detects a current (I-H) that flows from a transistor (2) being a switching element for an inductor, and a current detection circuit (230) which detects a flywheel current (I-L) at the turn-OFF of the switching element, wherein when it has been detected by the overcurrent detection circuit (221) that the value of the current (I-H) (=inductor current) exceeds a certain predetermined value, the switching operation of the switching element is masked and stopped until it is detected by the current detection circuit (230) that the flywheel current becomes, at most, another predetermined value.

The overcurrent protection method of JP-A-2004-364488 has had the problem that, since two detection circuits are required for detecting the current (I-H), which flows from the transistor (2) to the inductor, and the flywheel current (I-L), respectively, the cost of the switching power supply circuit is increased.

In addition, in an overcurrent protection operation stated in JP-A-2004-364488, it is not supposed to establish synchronization between a timing at which the switching element is unmasked from a drive pulse and a timing at which a PWM pulse for the switching element is subsequently fed for the first time. This poses the problem that, since the minimum value of the inductor current disperses depending upon both the timings, the average value of the inductor currents cannot be predicted, so exact switching control becomes difficult. This problem conspicuously arises especially in a case where the switching frequency of the switching element is low.

Further, with an overcurrent protection circuit that is applied to PFM (pulse frequency modulation) control of a fixed ON-time system, in a case where an output voltage has been reduced by overcurrent limitation, a control circuit performing a constant-voltage control continues to raise a switching frequency with the intention of increasing the output voltage. This poses the problem that the overcurrent limitation function based on the prior-art system does not operate effectively.

Such a case can also be coped with by setting an upper limit to the switching frequency by any means. However, the design of an overcurrent protection circuit for the DC-DC converter needs to anticipate a frequency margin to some extent. That is, the overcurrent protection circuit requires an overcurrent limitation function that can reliably cope with an overcurrent state even at frequencies higher than a frequency that is used in an ordinary operation.

SUMMARY OF THE INVENTION

The present invention has been made in view of such drawbacks, and it has for its object to provide a DC-DC converter that is not expected to become incapable of limiting an overcurrent even when a delay is involved in an overcurrent detection operation.

According to the invention, in order to solve the above problems, there is provided a DC-DC converter including a first switching element which is connected to a high potential side of an input power source; a second switching element which is connected in series with the first switching element, and which is connected to a low potential side of the input power source; a filter circuit which is connected to a connection point between the first switching element and the second switching element, and which includes an inductor and a smoothing capacitor that feed a smoothed output voltage to a load circuit; a voltage detection circuit which detects an output voltage of the load circuit so as to output a negative feedback signal; a control circuit which compares the negative feedback signal and a first reference voltage and amplifies a difference between them, so as to output control signals for switching the first switching element and the second switching element; and driver circuits which alternately ON/OFF-control the first switching element and the second switching element in accordance with the control signals; characterized by including overcurrent detection means for detecting an inductor current which flows through the inductor during the ON control of the second switching element, and for deciding whether or not the inductor current has decreased down to a predetermined magnitude; and timing alteration means for altering a switching timing of the control signal so as to extend an OFF-control time period of the first switching element until it is decided by the overcurrent detection means that the inductor current has decreased to the predetermined magnitude.

The DC-DC converter of the invention is not expected to become incapable of overcurrent limitation when the output voltage has been reduced, and it can be configured so as to be adapted even for a PFM converter of fixed ON time period. The foregoing and other objects, features, aspects and advantages of the invention will become more apparent from the following detailed description of the invention when taken in conjunction with the accompanying drawings.

DESCRIPTION OF THE PREFERRED EMBODIMENTS

Figure 1:
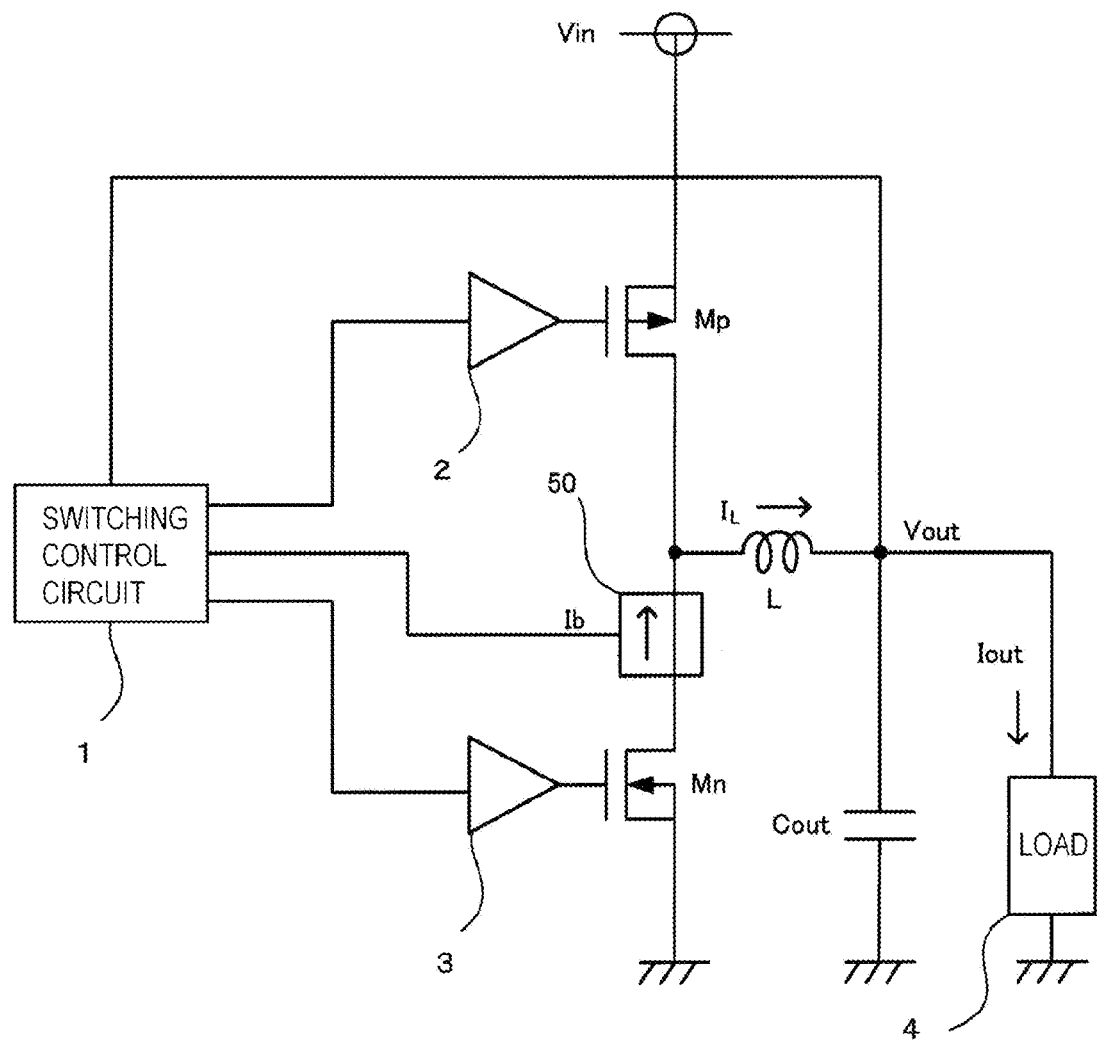
FIG. 1 is a block diagram showing the fundamental configuration of a DC-DC converter according to the present invention.
Figure 5:
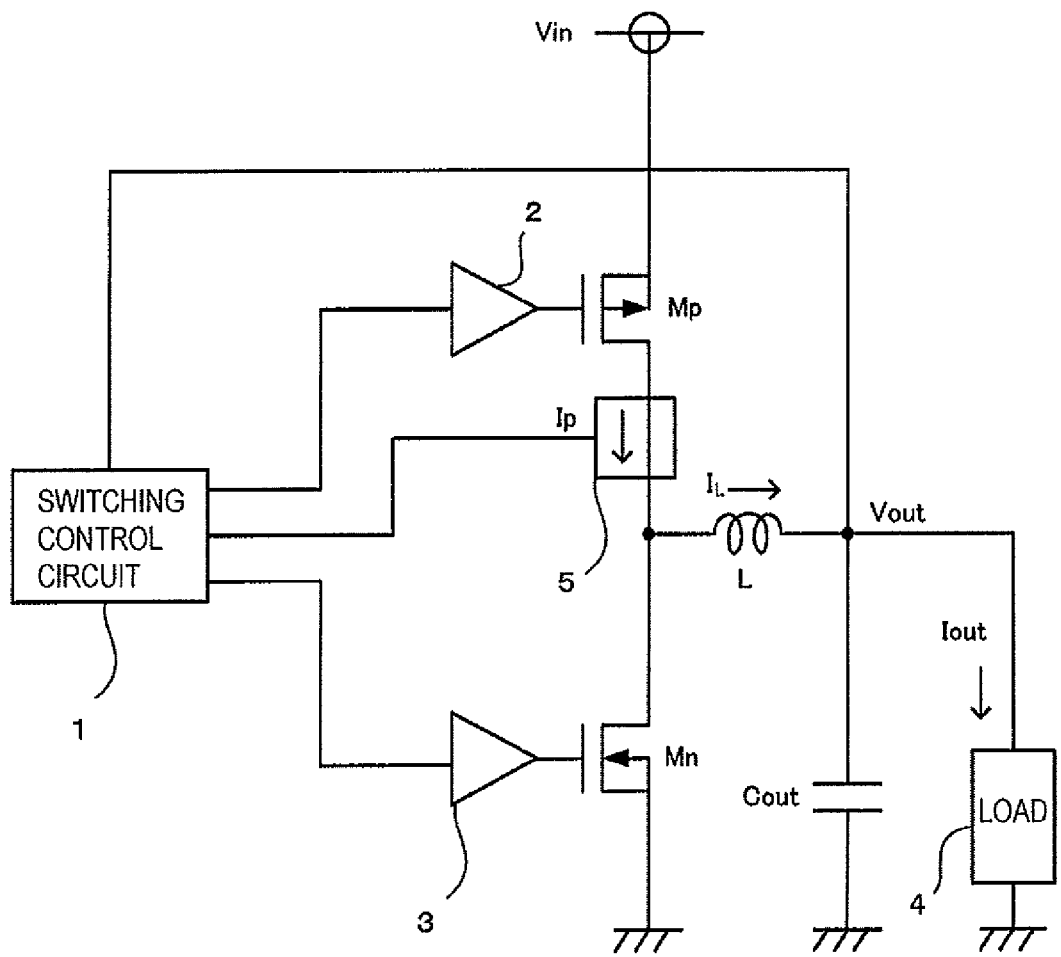
FIG. 5 is a diagram showing an example of a prior-art DC-DC converter which performs overcurrent protection by the peak limitation of an inductor current.
Figure 6A:
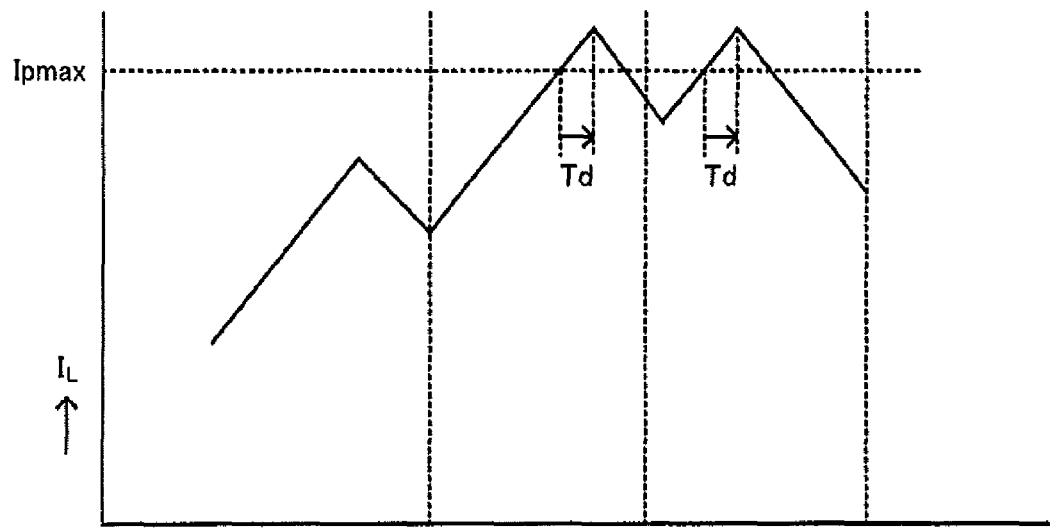
FIGS. 6A and 6B are diagrams showing how the inductor currents change in states in which the overcurrent protection function of the prior-art DC-DC converter is operating, in cases where an output voltage Vout is large and where it is small, respectively.
Figure 6B:
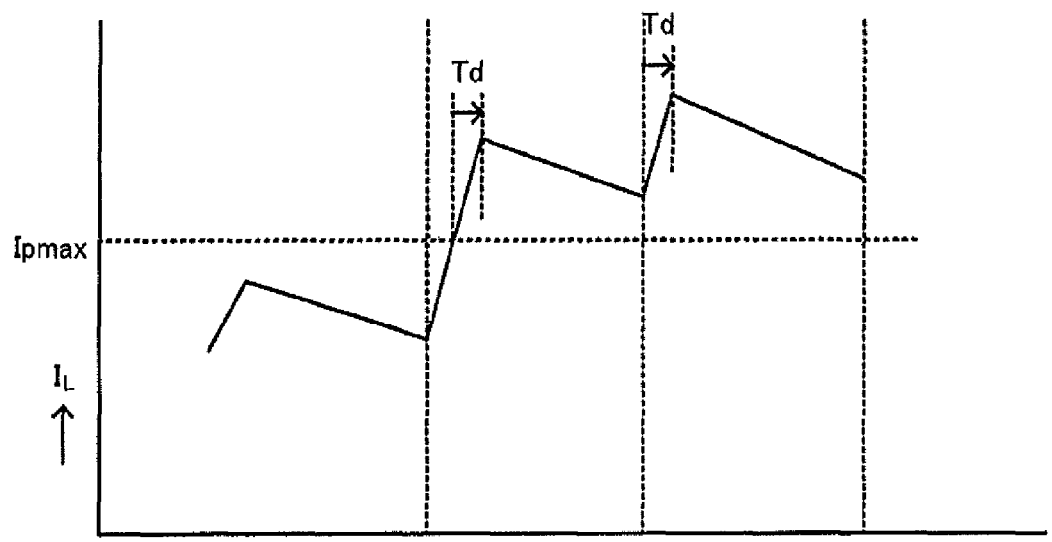

Now, embodiments of the present invention will be described with reference to the drawings. FIG. 1 is a block diagram showing the fundamental configuration of a DC-DC converter according to the present invention. In FIG. 1, the same parts as in the prior-art DC-DC converter shown in FIG. 5 are assigned identical reference numerals and signs.

In the DC-DC converter of the invention, an overcurrent detection circuit 50 is interposed between the drain terminal of a switching element Mn and an inductor L in order to limit the bottom current value (Ib) of an inductor current $I_L$.

Here, the overcurrent detection circuit 50 is connected to a switching control circuit 1, and it detects a current flowing through the switching element Mn, namely, an inductor current $I_L$ flowing from the switching element Mn to the inductor L, by employing a current transformer, or by employing a sense resistance and an amplifier, by way of example, and then compares the detected current with a prescribed value Ibmax, thereby to decide whether or not the inductor current $I_L$ has decreased down to the prescribed value Ibmax. The switching control circuit 1 alters the switching timing of a control signal so as to extend the OFF control time of a switching element Mp until the overcurrent detection circuit 50 decides that the inductor current $I_L$ has lowered to the predetermined magnitude.

Figure 2A:
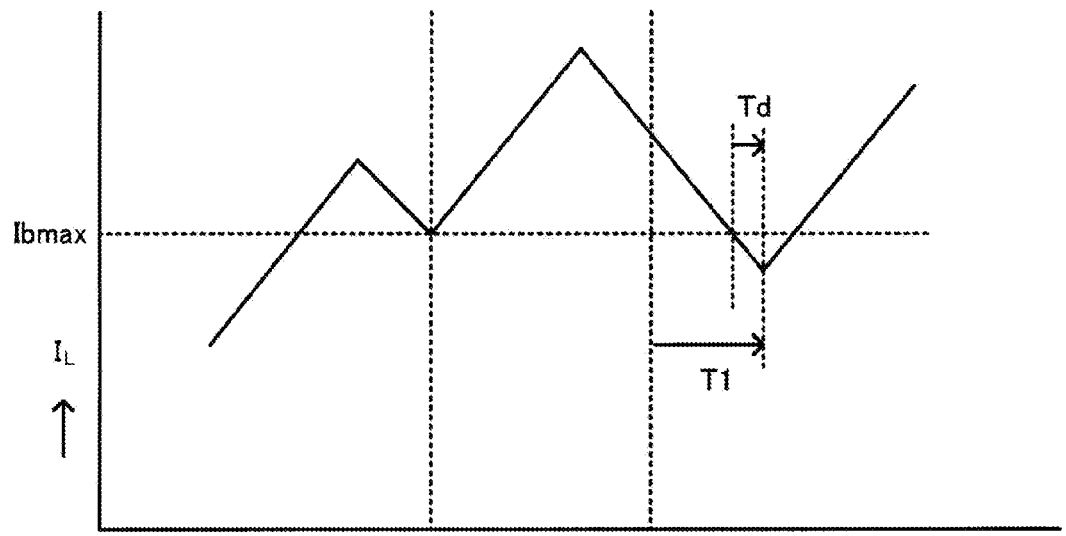
FIGS. 2A and 2B are diagrams showing the changes of the magnitudes of inductor currents in states in which an overcurrent protection function is operating in the DC-DC converter of the invention, in the cases where an output voltage Vout is large and where it is small, respectively.
Figure 2B:
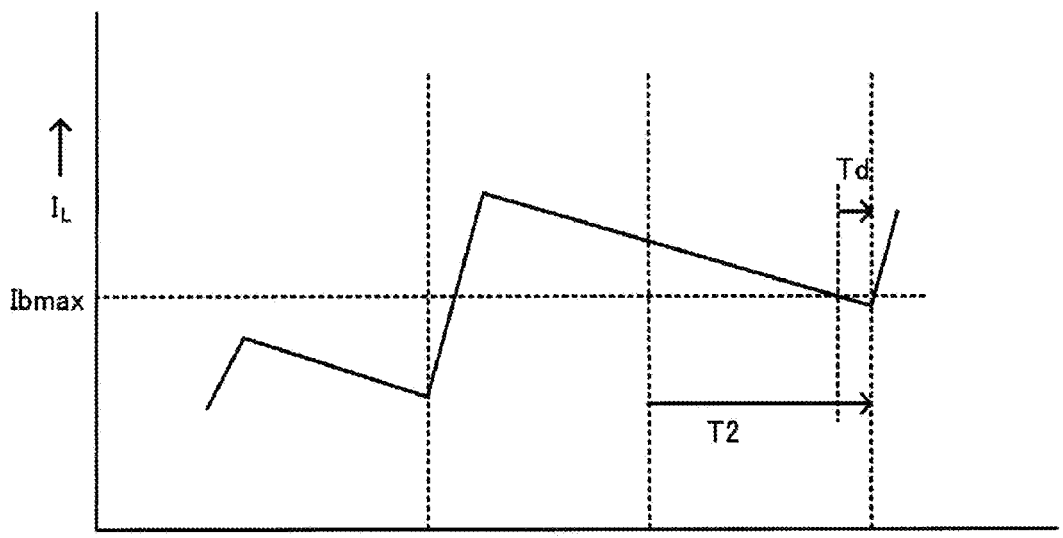

FIGS. 2A and 2B are diagrams showing the changes of the magnitudes of the inductor currents in states in which an overcurrent protection function is operating in the DC-DC converter of the invention, in cases where an output voltage Vout is large and where it is small, respectively. By the way, in each of the figures, the axis of ordinates represents the inductor current $I_L$, while the axis of abscissas represents the time.

In each of FIGS. 2A and 2B, while the inductor current $I_L$ flowing through the switching element Mn exceeds the prescribed value Ibmax, the ON time of the switching element Mn is extended "T1" or "T2" by the switching control circuit 1. After the inductor current $I_L$ has decreased down to, at most, the prescribed value Ibmax, the inductor current $I_L$ is shifted to the next switching cycle. In the next switching cycle, the inductor current $I_L$ is raised from the magnitude of, at most, the prescribed value Ibmax. That is, the extension time T1 or T2 is set so as to limit the bottom current value Ib of the inductor current $I_L$ to, at most, the prescribed value Ibmax, whereby the overcurrent limitation function in the switching control circuit 1 is made reliable.

Further, with the switching control circuit 1, also the prescribed value Ipmax of the peak current Ip of the inductor current $I_L$ can be limited within a range in which the extension time T1 or T2 is increasable to the ON time Ton of the switching element Mp.

The reason therefor is as stated below. The peak current Ip is limited as:

$$Ip = Ib + Ton(Vin - Vout)/L$$

$$< Ibmax + Ton(Vin - Vout)/L$$

Therefore, the prescribed value Ipmax of the peak current Ip may be made Ibmax+Ton(Vin−Vout)/L which is determined by the prescribed value Ibmax.

In addition, the average value of the inductor current $I_L$ which flows through the inductor L during the ON time Ton becomes a value which is equal or substantially equal to Ibmax+0.5 Ton(Vin−Vout)/L. Here, "Vin" denotes an input voltage value from a battery to the DC-DC converter, "Vout" the output voltage value to a load circuit 4, and "L" the inductance value of the inductor L. Accordingly, the switching control circuit 1 is appropriately applied to a switching control system of fixed ON time wherein the ON time Ton of the switching element Mp is always constant and does not change, as in a DC-DC converter of PFM (pulse frequency modulation) system.

Further, the overcurrent detection circuit 50 extends the switching cycle itself until the inductor current $I_L$ becomes lower than the prescribed value Ibmax. Therefore, even when a delay time is involved in an overcurrent detection operation as in the overcurrent detection circuit 5 in the prior art, a risk of the overcurrent limitation becoming impossible is eliminated. Accordingly, the overcurrent detection circuit 50 has the advantage that, even in a case where the load circuit 4 of the DC-DC converter has fallen into a short-circuited state, overcurrent limitation is still possible.

Figure 3:
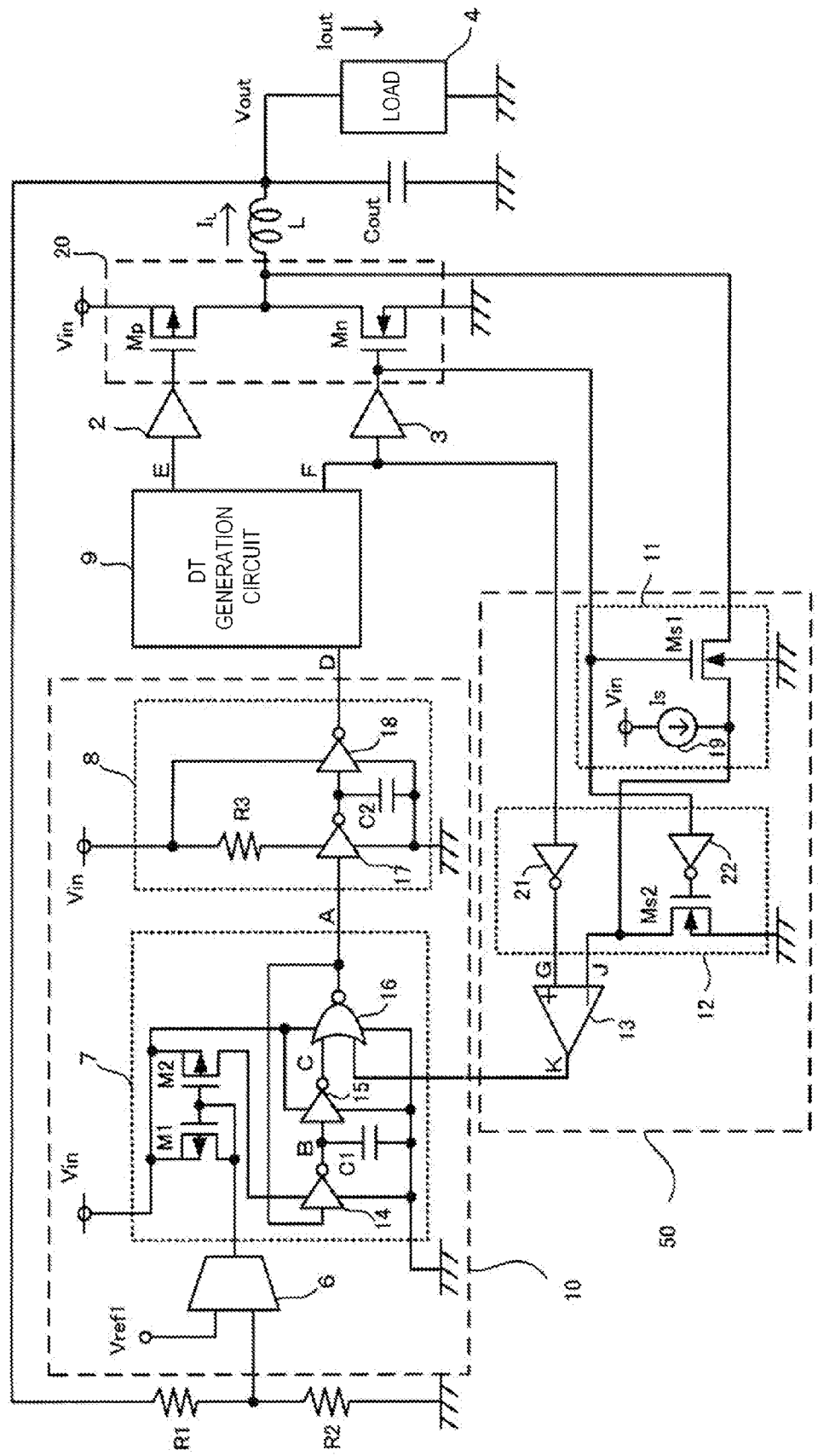
FIG. 3 is a circuit diagram showing a DC-DC converter according to an embodiment.

Next, the practicable configuration and operation of a PFM converter in which an overcurrent protection circuit is incorporated will be described as an example of such a DC-DC converter. FIG. 3 is a circuit diagram showing a DC-DC converter according to a preferred embodiment.

A switching element Mp and a switching element Mn are connected in series, thereby to constitute an output stage 20. The source terminal of the switching element Mp is connected to the high potential side of an input power source Vin, while the drain terminal thereof is connected to the drain terminal of the switching element Mn, and the source terminal of the switching element Mn is grounded.

An inductor L and an output capacitor Cout constitute a filter circuit, and this filter circuit is connected to the connection point between the switching elements Mp and Mn of the output stage 20 so as to feed a smoothed output voltage to a load circuit 4. An output voltage Vout to the load circuit 4 is fed as a negative feedback signal to a PFM control circuit 10 through a voltage detection circuit in which resistances R1 and R2 are connected in series.

The PFM control circuit 10 is constituted of an error amplification circuit 6, an oscillation circuit (current-controlled oscillation circuit) 7 and a pulse generation circuit 8. The error amplification circuit 6 compares the negative feedback signal and a first reference voltage Vref1 and amplifies the difference thereof, thereby to output an error signal, which is necessary for the switching controls of the switching elements Mp and Mn. The negative feedback signal is subjected to voltage division by the resistances R1 and R2 and fed to one input terminal of the error amplification circuit 6, while the first reference voltage Vref1 is fed to the other input terminal thereof. The current-controlled oscillation circuit 7 generates a pulse signal at an oscillation frequency that corresponds to the error signal outputted from the error amplification circuit 6. The pulse generation circuit 8 generates a control signal for a dead-time generation circuit 9 on the basis of the pulse signal. As the error amplification circuit 6 shown in FIG. 3 is configured of a transconductance amplifier, the error signal becomes a current signal.

The PFM control circuit 10 is connected with driver circuits 2 and 3 through the dead-time generation circuit 9. Here, when the switching elements Mp and Mn are alternately ON/OFF-controlled by the control signal from the pulse generation circuit 8, a dead time that simultaneously OFF-controls the switching elements Mp and Mn is set for control signals from the dead-time (DT) generation circuit 9 to the driver circuits 2 and 3.

An overcurrent detection circuit 50 is constituted of a level shift circuit 11, a reset circuit 12 and a comparator circuit 13. The overcurrent detection circuit 50 detects an inductor current $I_L$ which flows through the inductor L at the ON-control of the switching element Mn, so as to decide whether or not the inductor current $I_L$ has decreased down to a predetermined magnitude.

Next, the practicable configurations of the PFM control circuit 10 and the overcurrent detection circuit 50 will be further described. The current-controlled oscillation circuit 7 is constituted of a current mirror circuit which consists of two FETs (hereinbelow, termed "transistors") M1 and M2 of P-channel type, inverter circuits 14 and 15, a capacitor C1, and a NOR circuit 16. The source terminals of the transistors M1 and M2 are both connected to the input voltage Vin of the battery, and the drain terminal and gate terminal of the transistor M1 and the gate terminal of the transistor M2 are respectively connected with the output terminal of the error amplification circuit 6. In addition, the drain terminal of the transistor M2 is connected with the power supply terminal of the inverter circuit 14.

The inverter circuit 14 has the capacitor C1 connected to its output terminal, and it is further connected with one input terminal of the NOR circuit 16 through the inverter circuit 15. The output terminal of the NOR circuit 16 forms the output terminal of the current-controlled oscillation circuit 7, and a feedback loop is led from the output terminal to the input terminal of the inverter circuit 14. Thus, a ring oscillator is formed.

The NOR circuit 16 has the output signal "K" of the overcurrent detection circuit 50 inputted to its other input terminal, and it is configured as a logic gate which stops oscillation in accordance with the output of the overcurrent detection circuit 50 within the loop of the ring oscillator.

The pulse generation circuit 8 is configured of inverter circuits 17 and 18, a resistance R3 and a capacitor C2. Here, the power supply terminal of the inverter circuit 17 is fed with the input voltage Vin from the battery through the resistance R3, and the output terminal of the inverter circuit 17 is connected with the capacitor C2 and the inverter circuit 18. The output terminal of the inverter circuit 18 is connected to the dead-time generation circuit 9 as the output terminal of the pulse generation circuit 8.

The level shift circuit 11 of the overcurrent detection circuit 50 is constituted of a switching element Ms1 being an FET of N-channel type, and a constant-current source 19. The switching element Ms1 has its substrate terminal grounded, and its source terminal (the right terminal of the switching element Ms1 in FIG. 3) and gate terminal are respectively connected with the drain terminal and gate terminal of the switching element Mn so that voltages equal to those of the drain terminal and gate terminal of the switching element Mn may be respectively applied to the source and gate terminals of the switching element Ms1. In addition, the drain terminal of the switching element Ms1 (the left terminal of the switching element Ms1 in FIG. 3) has the input voltage Vin of the battery connected thereto through the constant-current source 19, and it is fed with a constant current Is.

In the level shift circuit 11, the offset voltage of the switching element Ms1 (the ON resistance value of the switching element Ms1×the constant current Is) is added to a voltage drop which arises in accordance with the inductor current $I_L$ flowing through the switching element Mn, and the resulting sum is outputted as an output signal "J". That is, the output signal "J" of the level shift circuit 11 becomes the criterion of the inductor current $I_L$, and that drain terminal voltage of the switching element Mn which becomes a negative value relative to the inductor current $I_L$ in a forward direction is indirectly compared with a second reference voltage, for example, a ground potential by using the signal "J".

The reset circuit 12 of the overcurrent detection circuit 50 is configured of two inverter circuits 21 and 22 and a switching element Ms2, being an FET of N-channel type. The inverter circuit 21 is connected with the output terminal of the dead-time generation circuit 9 on the side of the driver circuit 3 and is fed with a signal "F", and the output signal "G" of the inverter circuit 21 is outputted to the "+" side input terminal of the comparator circuit 13.

Further, the input terminal of the inverter circuit 22 is connected with the gate terminal of the switching element Mn, while the output terminal thereof is connected to the gate terminal of the switching element Ms2. The switching element Ms2 has its drain terminal connected with the "−" side input terminal of the comparator circuit 13, and has its source terminal grounded. In the level shift circuit 11, accordingly, the offset voltage Vs which is generated by the flow of the constant current Is of the constant-current source 19 through the switching element Ms1 is added to the drain terminal voltage of the switching element Mn, so that the voltage signal "J" which corresponds to the current value of the inductor current $I_L$ flowing through the switching element Mn can be compared with the ground potential in the comparator circuit 13.

Figure 4:
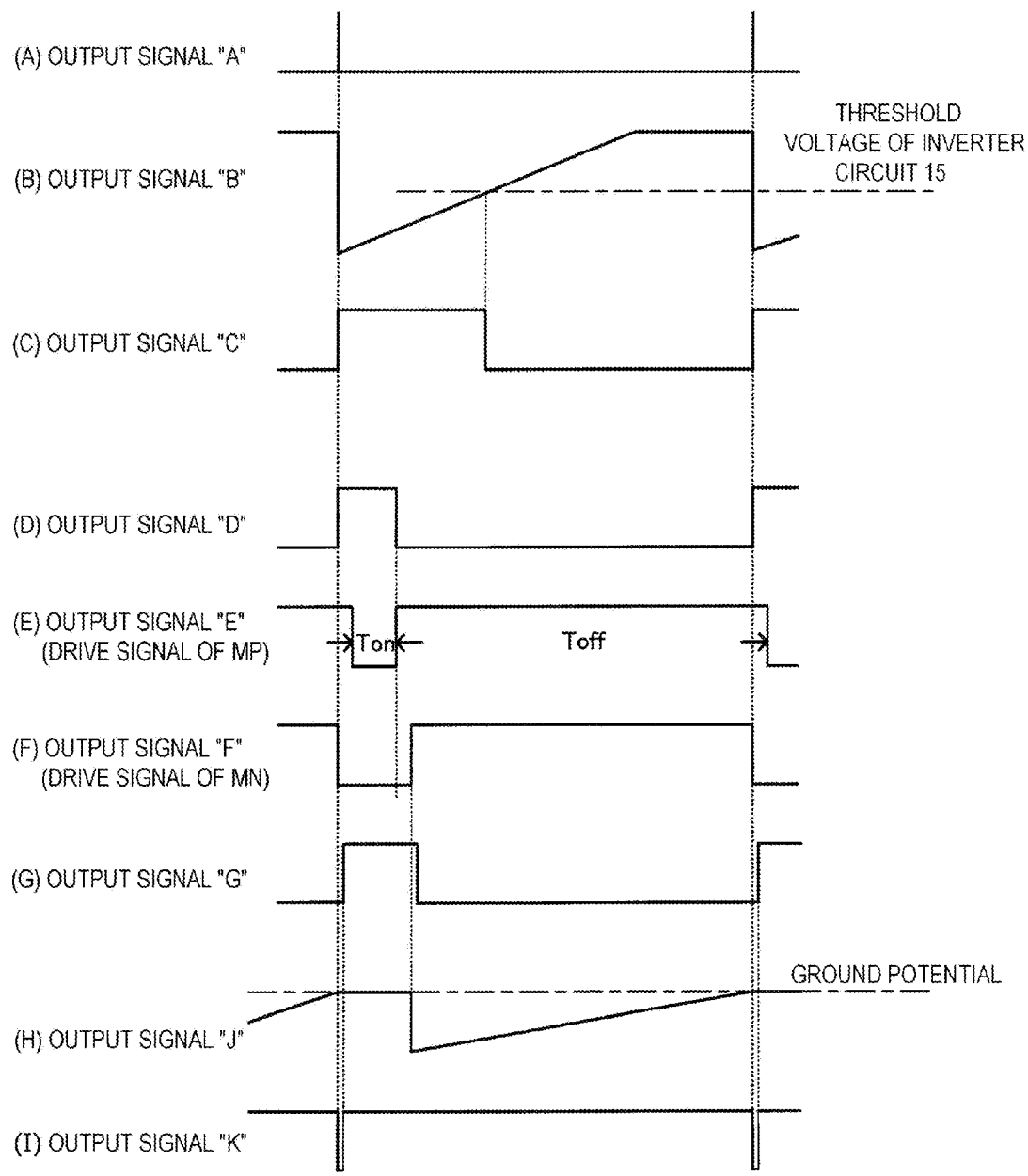
FIG. 4 is a timing chart showing the signal waveforms of the various parts of the DC-DC converter shown in FIG. 3.

FIG. 4 is a timing chart showing the signal waveforms of the various parts of the DC-DC converter shown in FIG. 3. (a) in FIG. 4 shows the waveform of the output signal "A" of the current-controlled oscillation circuit 7. Additionally, (b) and (c) in the figure show the output signals "B" and "C" of the two inverter circuits 14 and 15 of the current-controlled oscillation circuit 7, respectively.

The current-controlled oscillation circuit 7 feeds its output signal "A" to the pulse generation circuit 8 as a whisker-like pulse signal in a cycle that changes in accordance with a pull-in current being the output of the transconductance amplifier of the error amplification circuit 6. More specifically, as the output voltage Vout becomes higher owing to the lighter load of the load circuit 4, the pull-in current of the transconductance amplifier becomes smaller, so that the cycle of the output signal "A" lengthens further. Conversely, when the load circuit 4 becomes a heavier load, the cycle shortens further. In the pulse generation circuit 8, the pulse width of the pulse signal is extended to a predetermined length, thereby to generate a PFM signal (output signal "D") having a predetermined ON time as shown at (d) in the figure.

The dead-time generation circuit 9 is fed with the output signal "D", and it generates output signals "E" and "F" which alternately ON/OFF-control the two switching elements Mp and Mn of the output stage 20, at timings shown at (e) and (f) in FIG. 4. The switching element Mp of the output stage 20 falls into the ON control state during the period "Ton" of the output signal "E". On that occasion, the other switching element Mn is brought into the OFF control state by the output signal "F". The reset circuit 12 of the overcurrent detection circuit 50 is actuated by the output signal "F" for bringing the switching element Mn into the OFF control state, and the output signal "G" of the reset circuit 12 becomes an H (high) level, while the output signal "J" thereof becomes an L (low) level. Then, the output signal "K" of the overcurrent detection circuit 50 is set to the H level, and a reset state is established. Thereafter, the switching element Mp falls into the OFF control state during an OFF period "Toff" for which the switching element Mn falls into the ON control state, and the inductor current $I_L$ begins to decrease.

At this time, as shown at (g) in FIG. 4, the output signal "G" of the inverter circuit 21 and the output signal of the inverter circuit 22 become the L level, whereby the reset state is canceled. In addition, the H level of the output signal "K" of the comparator circuit 13 continues until the output signal "J" of the level shift circuit 11 becomes greater than the ground potential. Therefore, the output of the pulse from the current-controlled oscillation circuit 7 is extended till then, and the ON control state of the switching element Mn and the OFF control state of the switching element Mp are continued. When the output signal "J" of the level shift circuit 11 becomes greater than the ground potential, the output signal "K" of the comparator circuit 13 becomes the L level, and the oscillation operation of the ring oscillator is permitted, so that the current-controlled oscillation circuit 7 shifts to the next switching cycle.

As described above, according to the DC-DC converter of the invention, the bottom current value (Ib) of the inductor current $I_L$ is limited, whereby when the output voltage has lowered, the overcurrent limitation is not apprehended to become impossible even in the existence of the delay in the overcurrent detection operation.

Further, the oscillation circuit 7 constituting the PFM control circuit 10 of the DC-DC converter has been exemplified as the current-controlled oscillation circuit in which the capacitor C1 is charged by a current obtained in such a way that the pull-in current being the output signal of the error amplification circuit 6 is copied by the current mirror circuit, and in which the oscillation cycle is determined by a time period expended until the charged voltage of the capacitor C1 reaches the threshold voltage of the inverter circuit 15, but the oscillation circuit 7 is not restricted to the current-controlled oscillation circuit. By way of example, an error amplification circuit is made a voltage output type by employing an operational amplifier or converting the current output of the error amplification circuit 6 shown in FIG. 3, into a voltage signal by resistances, whereby a voltage controlled oscillator whose oscillation frequency is controlled on the basis of the output voltage of the voltage signal can also be applied to the DC-DC converter.

Various modifications and alterations of this invention will be apparent to those skilled in the art without departing from the scope and spirit of this invention, and it should be understood that this invention is not limited to the illustrative embodiments set forth herein.

What is claimed is:

1. A DC-DC converter comprising:
   a first switching element connected to a high potential side of an input power source;
   a second switching element connected in series with the first switching element, and connected to a low potential side of the input power source;
   a filter circuit connected to a connection point between the first switching element and the second switching element, and including an inductor and a smoothing capacitor that feed a smoothed output voltage to a load circuit;
   a voltage detection circuit that detects an output voltage of the load circuit so as to output a negative feedback signal;
   a control circuit that compares the negative feedback signal and a first reference voltage and amplifies a difference therebetween, so as to output first and second control signals for switching the first and second switching elements respectively; and
   driver circuits that alternately control the first switching element and the second switching element to be ON and OFF respectively in accordance with the first and second control signals; the driver circuits including:
      an overcurrent detection circuit configured to detect a magnitude of an inductor current that flows through the inductor during an ON period of the second switching element by comparing a voltage drop across the second switching element with a second reference voltage, and configured to decide whether or not the magnitude of the inductor current has decreased to a predetermined magnitude; and
      a timing alteration circuit configured to alter timing of the first control signal so as to extend an OFF period of the first switching element until it is decided by said overcurrent detection means that the inductor current has decreased to the predetermined magnitude,
   wherein said overcurrent detection circuit comprises:
      a level shift circuit that adds a predetermined voltage to a drain-source voltage of the second switching element, so as to output a resulting voltage;
      a reset circuit that fixes an output signal from said level shift circuit, to a predetermined value during the OFF period of the second switching element; and
      a decision circuit that decides if an output signal voltage from said level shift circuit has reached the second reference voltage during the ON period of the second switching element.

2. The DC-DC converter as defined in claim 1, wherein the control circuit comprises:
   an error amplification circuit that amplifies an error between the negative feedback signal and the first reference voltage;
   an oscillation circuit that generates a pulse signal at an oscillation frequency corresponding to an output of said error amplification circuit; and
   a pulse generation circuit that generates the first and second control signals on the basis of the pulse signal;
   said pulse generation circuit configured to fix an ON period of the first switching element to extend and alter an OFF period thereof.

3. The DC-DC converter as defined in claim 2, wherein said timing alteration circuit stops and controls an oscillation operation of said oscillation circuit while said overcurrent detection circuit decides that the inductor current is at least the predetermined magnitude.

4. The DC-DC converter as defined in claim 1, further comprising a dead-time generation circuit, connected between the control circuit and the driver circuits, which sets a dead time during which the first switching element and the second switching element are controlled to be simultaneously OFF.

5. A DC-DC converter comprising:
   a first switching element connected to a high potential side of an input power source;
   a second switching element connected in series with the first switching element, and connected to a low potential side of the input power source;
   a filter circuit connected to a connection point between the first switching element and the second switching element, and including an inductor and a smoothing capacitor that feed a smoothed output voltage to a load circuit;
   a voltage detection circuit that detects an output voltage of the load circuit so as to output a negative feedback signal;
   a control circuit that compares the negative feedback signal and a first reference voltage and amplifies a difference therebetween, so as to output first and second control signals for switching the first and second switching elements respectively; and
   driver circuits that alternately control the first switching element and the second switching element to be ON and OFF respectively in accordance with the first and second control signals; the driver circuits including:
      an overcurrent detection circuit configured to detect an inductor current that flows through the inductor during an ON period of the second switching element, and for deciding whether or not the inductor current has decreased to a predetermined magnitude; and
      a timing alteration circuit configured to alter timing of the first control signal so as to extend an OFF period of the first switching element until it is decided by said overcurrent detection means that the inductor current has decreased to the predetermined magnitude,
   wherein the control circuit comprises:
      an error amplification circuit that amplifies an error between the negative feedback signal and the first reference voltage;
      an oscillation circuit that generates a pulse signal at an oscillation frequency corresponding to an output of said error amplification circuit; and a pulse generation circuit that generates the first and second control signals on the basis of the pulse signal;
said pulse generation circuit configured to fix an ON period of the first switching element to extend and alter an OFF period thereof, and
wherein said oscillation circuit is a ring oscillator.

6. The DC-DC converter as defined in claim 5, further comprising a dead-time generation circuit, connected between the control circuit and the driver circuits, which sets a dead time during which the first switching element and the second switching element are controlled to be simultaneously OFF.

7. A DC-DC power conversion method comprising:
supplying a high potential side of an input power source to a first switching element;
supplying a low potential side of the input power source to a second switching element connected in series with the first switching element;
feeding a smoothed output voltage to a load circuit from a filter circuit connected to a connection point between the first switching element and the second switching element, the filter circuit including an inductor and a smoothing capacitor;
detecting an output voltage of the load circuit so as to output a negative feedback signal;
comparing the negative feedback signal and a first reference voltage and amplifying a difference therebetween, so as to output first and second control signals for switching the first and second switching elements respectively; and
alternately controlling the first switching element and the second switching element to be ON and OFF respectively in accordance with the first and second control signals; including:
detecting a magnitude of an inductor current that flows through the inductor during an ON period of the second switching element by comparing a voltage drop across the second switching element with a second reference voltage, and deciding whether or not the inductor current has decreased to a predetermined magnitude; and
altering timing of the first control signal so as to extend an OFF period of the first switching element until it is decided that the magnitude of the inductor current has decreased to the predetermined magnitude,
wherein said detecting the magnitude of the inductor current further comprises:
adding a predetermined voltage to the voltage drop across the second switching element, so as to output a resulting voltage;
fixing the resulting voltage to a predetermined value during the OFF period of the second switching element; and
deciding if the resulting voltage has reached the second reference voltage during the ON period of the second switching element.

8. The method as defined in claim 7, further comprising:
amplifying an error between the negative feedback signal and the first reference voltage;
generating a pulse signal at an oscillation frequency corresponding to a frequency of the error; and
generating the control signals on the basis of the pulse signal;
fixing an ON period of the first switching element to extend and alter an OFF period thereof.

9. The method as defined in claim 8, further comprising stopping and controlling an oscillation operation of said oscillation circuit while deciding that the inductor current is at least the predetermined magnitude.

10. The method as defined in claim 7, further comprising controlling the first switching element and the second switching element to be simultaneously OFF during a dead time.

* * * * *